July 8, 1941.  W. F. WRIGHT  2,248,265
WHEEL BALANCING WEIGHT
Filed Jan. 27, 1941
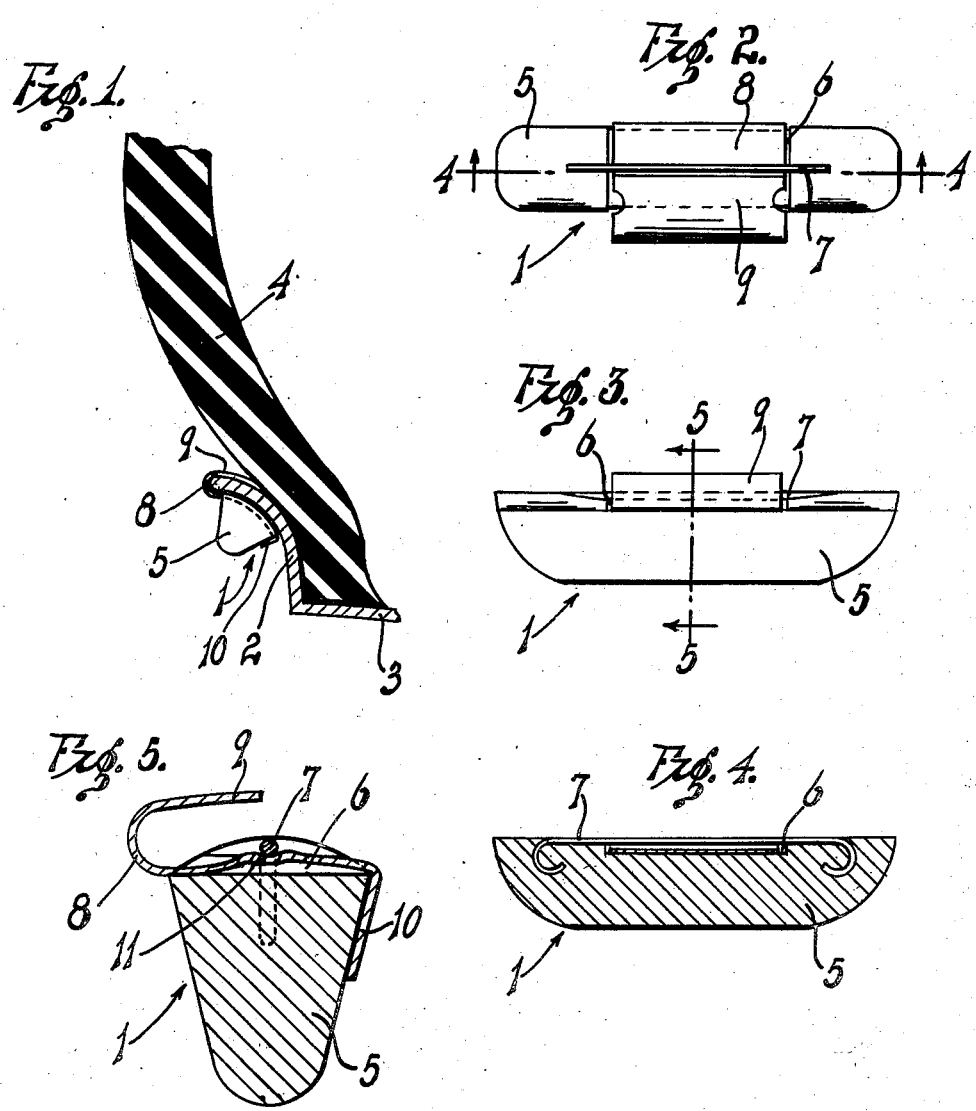
INVENTOR.
WILLIAM F. WRIGHT.
BY
ATTORNEY.

Patented July 8, 1941

2,248,265

UNITED STATES PATENT OFFICE 2,248,265

WHEEL BALANCING WEIGHT

William F. Wright, Santa Monica, Calif.

Application January 27, 1941, Serial No. 376,164

6 Claims. (Cl. 301—5)

This invention relates to a wheel balancing weight, whereby the static and dynamic balance of a wheel, such as automobile or truck, may be directed so that the wheel will rotate without movement or vibration at high speeds.

An object of my invention is to provide a novel wheel balance weight, which, when mounted on the wheel rim, will tenaciously retain its position, and which is easily placed by the workman.

A feature of my invention resides in the novel means of mounting the rim engaging clip on the weight body so that a snap on action, or lock, is provided to effectively hold the balance weight on the rim.

Another feature of my invention resides in the novel construction and arrangement of the clip, and the means of mounting this clip on the weight body so that the balance weight can be placed on the vehicle rim, or removed from this rim without distorting the weight body or the clip.

Another object is to provide a wheel balance weight of the character stated, which is simple in construction, and inexpensive to manufacture.

Other objects, advantages and features of invention may appear from the accompanying drawing, the subjoined detailed description, or the appended claims.

In the drawing:

Figure 1 is a fragmentary transverse sectional view of a wheel rim and tire, and showing my balance weight in position on the rim.

Figure 2 is a side elevation of my improved balance weight.

Figure 3 is a top plan view of the same.

Figure 4 is a sectional view taken on line 4—4 of Figure 2.

Figure 5 is an enlarged sectional view taken on line 5—5 of Figure 3.

Referring more particularly to the drawing, my wheel balance weight 1 is applied to the bead flange 2 of the rim 3. The usual tire casing 4 is mounted on the rim 3 in the usual and well known manner. The weight 1 consists of a body 5, preferably formed of a heavy moldable material such as lead. This weight body is held against the bead of the rim substantially as shown in Figure 1. The inner face of the weight body 5 is formed with a transverse groove 6. This groove is relatively shallow, being merely of such depth to accommodate the thickness of the wire or bar, and the rim engaging clip, as will be further described.

A wire, or bar 7 is mounted in the body 5 of the weight, the end of the wire being imbedded in the body, and the center portion extending across the groove 6. The top of the wire 7 is substantially flush with the inner surface of the body 5 of the weight. The wire is preferably formed of a spring material, such as steel, and is adapted to flex slightly when force is exerted against it by the rim engaging clip 8. The clip 8 includes a hook portion 9, which fits between the bead 2 and the tire 4. This particular arrangement of the clip is usual and well known in the art.

The clip then extends through the groove 6 under the wire 7, and the lower end of the clip may be bent over the bottom face of the weight, as shown at 10. The clip may also be provided with a slight indentation, as shown at 11, to receive the wire 7, thus the clip is effectively held in position on the weight, and the combined spring action of the clip, and the spring 7 will hold the weight body 5 tightly against the bead of the rim.

Also when inserting or removing the balance weight, the yieldable construction and arrangement of the clip will prevent distortion of the clip and the weight body.

Having described my invention, I claim:

1. A wheel balance weight comprising a weight body, a wheel rim engaging clip, a wire imbedded in the weight body, said clip being held between the weight body and the wire.

2. A wheel balance weight comprising a weight body, a wheel rim engaging clip, a wire imbedded in the weight body, said clip being held between the weight body and the wire, one end of the clip being bent over the edge of the weight body to prevent lateral shifting of the clip.

3. A wheel balance weight comprising a weight body, said body having a transverse groove in a face thereof, a wire imbedded in the weight body, and extending across said groove, a clip engageable with the wheel rim, said clip being fitted in the groove, and extending under the wire.

4. A wheel balance weight comprising a weight body, said body having a transverse groove in a face thereof, a wire imbedded in the weight body, and extending across said groove, a clip engageable with the wheel rim, said clip being fitted in the groove, and extending under the wire, one end of said clip being bent over the edge of the weight body to prevent lateral shifting of the clip.

5. A wheel balancing weight comprising a weight body, said body having a groove in one face thereof, a wire, both ends of the wire being imbedded in the body, the wire extending across said groove, and being free to flex, a rim engaging clip, a portion of the clip being fitted in the groove, and extending under the wire.

6. A wheel balancing weight comprising a weight body, said body having a groove in one face thereof, a wire, both ends of the wire being imbedded in the body, the wire extending across said groove, and being free to flex, a rim engaging clip, a portion of the clip being fitted in the groove, and extending under the wire, one end of said clip being bent over the edge of the body to prevent lateral shifting of the clip relative to the body.

WILLIAM F. WRIGHT.